United States Patent
Choi (10) Patent No.: US 12,308,398 B2
(45) Date of Patent: May 20, 2025

(54) SECONDARY BATTERY AND BATTERY PACK INCLUDING THE SAME

(71) Applicant: LG ENERGY SOLUTION, LTD., Seoul (KR)

(72) Inventor: Soon Hyung Choi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 498 days.

(21) Appl. No.: 17/641,270

(22) PCT Filed: Oct. 8, 2020

(86) PCT No.: PCT/KR2020/013794
§ 371 (c)(1),
(2) Date: Mar. 8, 2022

(87) PCT Pub. No.: WO2021/080224
PCT Pub. Date: Apr. 29, 2021

(65) Prior Publication Data
US 2022/0294032 A1    Sep. 15, 2022

(30) Foreign Application Priority Data
Oct. 24, 2019  (KR) .................. 10-2019-0133212

(51) Int. Cl.
*H01M 10/42* (2006.01)
*H01M 50/581* (2021.01)

(52) U.S. Cl.
CPC ..... *H01M 10/4235* (2013.01); *H01M 50/581* (2021.01)

(58) Field of Classification Search
None
See application file for complete search history.

(56) References Cited

U.S. PATENT DOCUMENTS 8,709,649 B2  4/2014 Lee
11,462,772 B2 * 10/2022 Jo .................. H01M 50/461
(Continued)

FOREIGN PATENT DOCUMENTS

CN   101546844 A   9/2009
CN   103703590 A   4/2014
(Continued)

OTHER PUBLICATIONS

Indian Office Action for Indian Application No. 202217019511, dated Mar. 18, 2024, with an English translation.
(Continued)

*Primary Examiner* — Kevin M Bernatz
(74) *Attorney, Agent, or Firm* — Birch, Stewart, Kolasch & Birch, LLP (57) ABSTRACT

A secondary battery has a short-circuit part accommodated in the exterior and electrical conductivity is attached to the separator in the electrode assembly. The short-circuit part is spaced apart from the positive electrode tab and the negative electrode tab at a temperature less than a predetermined temperature, and the short-circuit part is in contact with the positive electrode tab and the negative electrode tab by contraction of the separator, to which the short-circuit part is attached, at a temperature equal to or greater than the predetermined temperature to electrically connect the positive electrode tab to the negative electrode tab.

17 Claims, 6 Drawing Sheets

(56) References Cited

U.S. PATENT DOCUMENTS

| | | | |
|---|---|---|---|
| 2005/0026036 A1* | 2/2005 | Kimiya | H01M 10/4235 |
| | | | 429/144 |
| 2009/0246612 A1* | 10/2009 | Naoi | H01M 50/414 |
| | | | 429/246 |
| 2012/0301777 A1 | 11/2012 | Ahn | |
| 2013/0236766 A1* | 9/2013 | Seo | H01M 50/489 |
| | | | 427/458 |
| 2014/0170449 A1 | 6/2014 | Takahashi et al. | |
| 2014/0170450 A1 | 6/2014 | Takahashi et al. | |
| 2015/0037652 A1 | 2/2015 | Kim et al. | |
| 2017/0207438 A1 | 7/2017 | Zhu et al. | |
| 2020/0083519 A1* | 3/2020 | Kim | H01M 4/62 |
| 2024/0204199 A1* | 6/2024 | Kwon | H01M 4/13 |
| 2024/0304961 A1* | 9/2024 | Sakai | H01M 50/489 |

FOREIGN PATENT DOCUMENTS

| | | |
|---|---|---|
| JP | 2002-246012 A | 8/2002 |
| JP | 2005-100899 A | 4/2005 |
| JP | 2008-130458 A | 6/2008 |
| JP | 2014-112478 A | 6/2014 |
| JP | 2015-122321 A | 7/2015 |
| JP | 2015-130347 A | 7/2015 |
| JP | 2016-81668 A | 5/2016 |
| JP | 2016-105367 A | 6/2016 |
| JP | 2016-126880 A | 7/2016 |
| JP | 2019-102206 A | 6/2019 |
| KR | 10-2006-0039955 A | 5/2006 |
| KR | 10-2013-0097679 A | 9/2013 |
| KR | 10-2013-0131983 A | 12/2013 |
| KR | 10-2014-0072794 A | 6/2014 |
| KR | 10-2015-0045241 A | 4/2015 |
| KR | 10-2015-0062387 A | 6/2015 |
| KR | 10-1683974 B1 | 12/2015 |
| KR | 10-2016-0017362 A | 2/2016 |
| KR | 10-2017-0139305 A | 12/2017 |
| KR | 10-2018-0018050 A | 2/2018 |
| KR | 10-2018-0106409 A | 10/2018 |
| KR | 10-2019-0049191 A | 5/2019 |
| WO | WO 2013/137451 A1 | 9/2013 |

OTHER PUBLICATIONS

International Search Report (PCT/ISA/210) issued in PCT/KR2020/013794, dated Jan. 15, 2021.
Extended European Search Report for European Application No. 20879491.7, dated Apr. 14, 2023.

* cited by examiner

SECONDARY BATTERY AND BATTERY PACK INCLUDING THE SAME

CROSS-REFERENCE TO RELATED APPLICATION

The present application claims the benefit of the priority of Korean Patent Application 10-2019-0133212, filed on Oct. 24, 2019, which is hereby incorporated by reference in its entirety.

TECHNICAL FIELD

The present invention relates to a secondary battery and a battery pack including the secondary battery, and more particularly, to a secondary battery having a structure that is capable of preventing ignition from occurring when the secondary battery increases in temperature, and a battery pack including the secondary battery.

BACKGROUND ART

Secondary batteries that are repetitively chargeable and dischargeable may be classified into pouch type secondary batteries, prismatic type secondary batteries, and cylindrical type secondary batteries according to their manufacturing methods or structures. For example, such a pouch type secondary battery has a structure in which an electrode assembly is accommodated in a pouch having the form of a sheet. The pouch type secondary battery has advantages in terms of simplicity of a manufacturing method and a capacity per unit volume when compared to other types of secondary batteries and thus are being widely used in various fields.

The secondary battery has a problem that explosion or fire may occur during the use. For example, if the secondary battery abnormally increases in temperature due to an abnormal operation of the secondary battery, the explosion or fire may occur.

Therefore, when the temperature of the secondary battery increases abnormally, it is necessary to stop the operation of the secondary battery, thereby reducing a risk of the explosion or fire of the secondary battery.

DISCLOSURE OF THE INVENTION

Technical Problem

An object of the present invention for solving the above problem is to prevent explosion or fire of a secondary battery from occurring by inducing short circuit in the secondary battery when the secondary battery abnormally increases in temperature.

Technical Solution

According to one aspect of the present invention for achieving the above object, provided is a secondary battery including: an electrode assembly having a positive electrode, a separator, a negative electrode, and a separator alternately disposed, the electrode assembly including a positive electrode tab protruding from the positive electrode and a negative electrode tab protruding from the negative electrode; an exterior configured to accommodate the electrode assembly; and a short-circuit part accommodated in the exterior and having electrical conductivity, wherein the short-circuit part is attached to the separator in the electrode assembly, the short-circuit part is spaced apart from the positive electrode tab and the negative electrode tab at a temperature less than a predetermined temperature, and the short-circuit part is in contact with the positive electrode tab and the negative electrode tab by contraction of the separator at a temperature equal to or greater than the predetermined temperature to electrically connect the positive electrode tab to the negative electrode tab.

The positive electrode tab may protrude from a first side of the electrode assembly, and the negative electrode tab may protrude from a second side of the electrode assembly.

The short-circuit part may be attached to a first separator of a plurality of separators in the electrode assembly.

The short-circuit part may be attached to two or more of a plurality of separators in the electrode assembly.

The short-circuit part may be attached along a perimeter of the separator in the electrode assembly.

The short-circuit part may be provided in plurality, wherein a first short-circuit part of the plurality of short-circuit parts may be attached to a perimeter of a first side of the separator and a second short-circuit part of the plurality of short-circuit parts may be attached to a perimeter of a second side of the separator.

The short-circuit part may be spaced inward from the exterior.

The second side of the electrode assembly is opposite to the first side of the electrode assembly.

The second side of the electrode assembly is adjacent to the first side of the electrode assembly.

The short-circuit part may be spaced apart from the positive electrode and the negative electrode in the electrode assembly at the temperature less than the predetermined temperature and the temperature equal to or greater than the predetermined temperature.

The short-circuit part may extend from a first position, which is spaced a first distance (D1) from the positive electrode tab, to a second position, which is spaced a second distance (D2) from the negative electrode tab, at the temperature less than the predetermined temperature, wherein a length by which the separator, to which the short-circuiting part is attached, is contracted in a direction parallel to the first distance (D1) may be greater than the first distance (D1), and a length by which the separator, to which the short-circuiting part is attached, is contracted in a direction parallel to the second distance (D2) may be greater than the second distance (D2).

The exterior may include a pouch-type sheet exterior.

According to another aspect of the prevent invention for achieving the above object, a battery pack in which the secondary battery of claim 1 is provided in plurality.

Advantageous Effects

According to the present invention, when the temperature of the secondary battery increases abnormally, the short circuit may be induced in the secondary battery to prevent the explosion or fire of the secondary battery from occurring.

MODE FOR CARRYING OUT THE INVENTION

Hereinafter, a structure of a secondary battery according to the present invention will be described with reference to the accompanying drawings.

Secondary Battery

Figure 1:
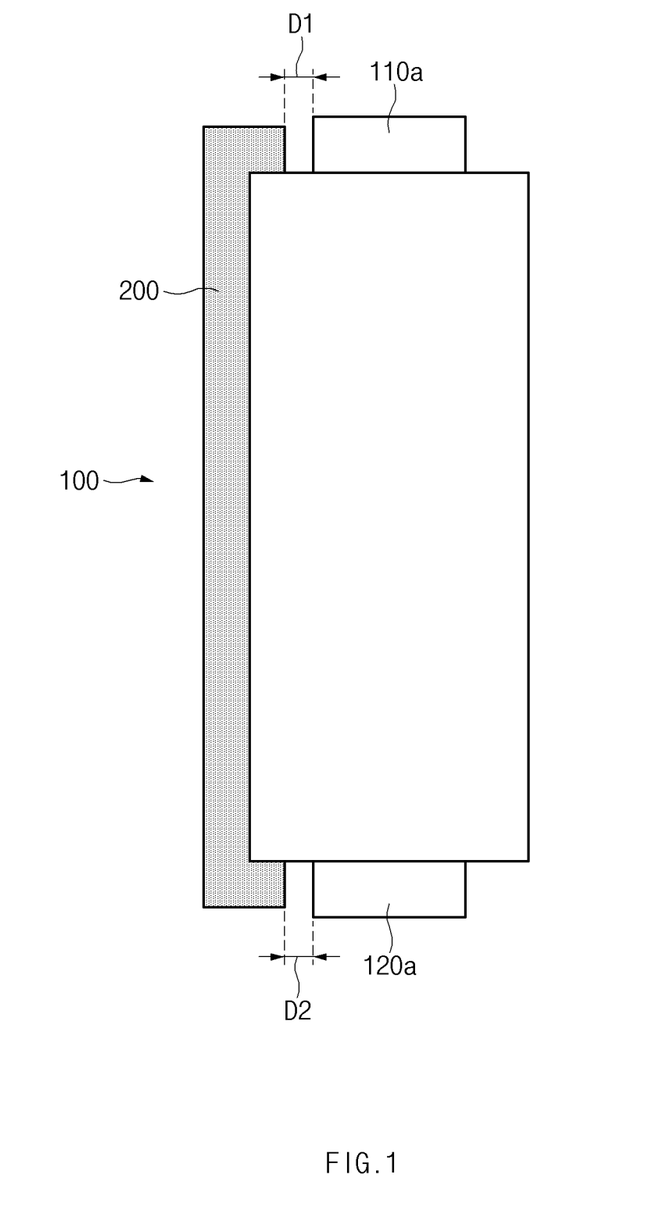
FIG. 1 is a plan view illustrating a state in which a secondary battery normally operates according to a first embodiment of the present invention.
Figure 2:
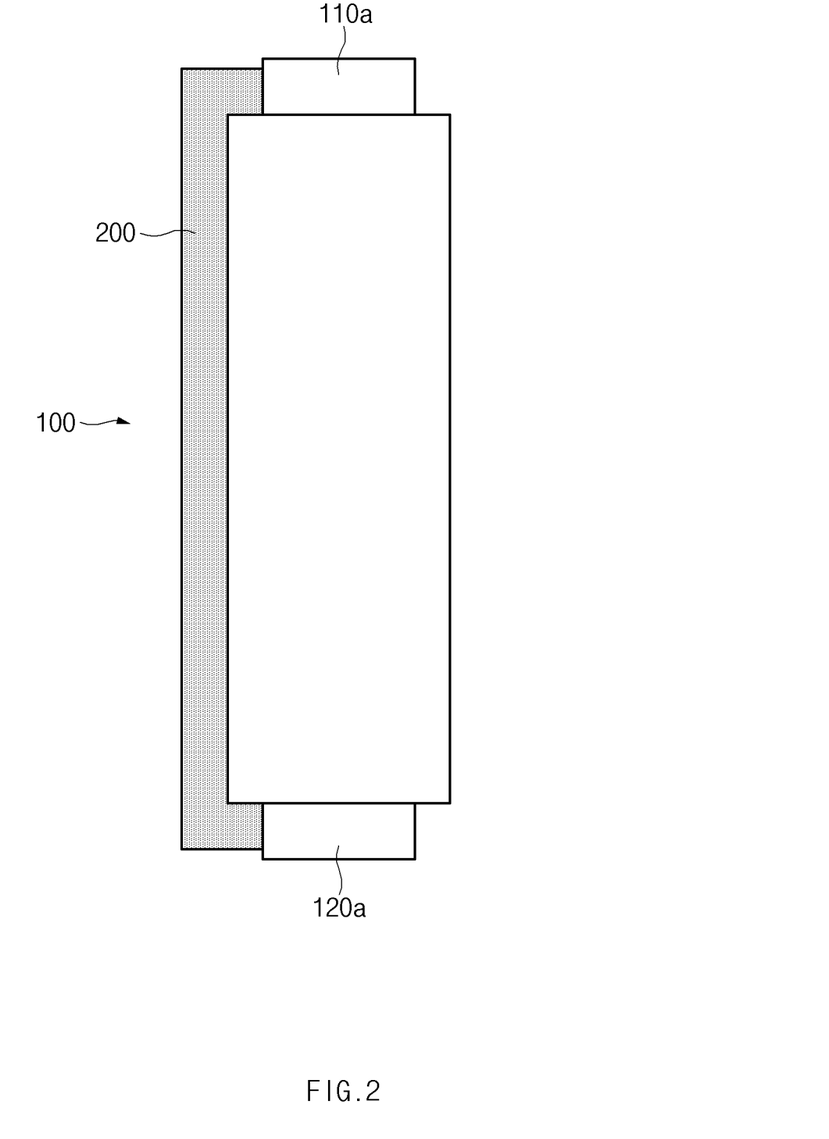
FIG. 2 is a plan view illustrating a state in which the secondary battery abnormally increases in temperature according to the first embodiment of the present invention.

FIG. 1 is a plan view illustrating a state in which a secondary battery normally operates according to a first embodiment of the present invention, and FIG. 2 is a plan view illustrating a state in which the secondary battery abnormally increases in temperature according to the first embodiment of the present invention.

As illustrated in FIGS. 1 and 2, a secondary battery according to the present invention may include an electrode assembly 100. The electrode assembly 100 may have a structure in which a positive electrode, a separator, a negative electrode, and a separator are alternately disposed in a thickness direction thereof.

The electrode assembly 100 may include a positive electrode tab 110a protruding from the positive electrode and a negative electrode tab 120a protruding from the negative electrode. The positive electrode tab 110a may protrude from one side of the electrode assembly 100, and the negative electrode tab 120a may protrude from the other side of the electrode assembly 100. FIGS. 1 and 2 illustrate a configuration in which the positive electrode tab 110a protrudes from one side (an upper side of the electrode assembly with reference to FIGS. 1 and 2) of the electrode assembly 100, and the negative electrode tab 120a protrudes from the other side (a lower side of the electrode assembly with reference to FIGS. 1 and 2) of the electrode assembly, which is formed at an opposite side of the one side of the electrode assembly, from which the positive electrode tab protrudes.

Also, the secondary battery according to the present invention may further include an exterior (not shown) accommodating the electrode assembly 100. The exterior may be a pouch-type sheet exterior. That is, the secondary battery according to the present invention may be a pouch type secondary battery. However, the secondary battery according to the present invention is not limited to the pouch type secondary battery and may be applied to various types of secondary batteries.

Continuously, referring to FIGS. 1 and 2, the secondary battery according to the present invention may further include a short-circuit part 200 having electrical conductivity. The short-circuit part 200 may be a constituent accommodated in the exterior of the secondary battery.

The short-circuit part 200 according to the present invention may be attached to the separator of the electrode assembly 100.

In this specification, that "the short-circuit part is attached inside the separator of the electrode assembly" means that when predetermined adhesion force is formed between the short-circuit part and the separator, and thus, when the separator is contracted or expanded in a region in which the adhesion force between the short-circuit part and the separator is generated, the short-circuit part may also be contracted or expanded according to the contraction and expansion of the separator.

The short-circuit part 200 may be attached along a circumference of the separator in the electrode assembly 100.

In the secondary battery according to the present invention, the separator may have a size greater than that of each of the positive electrode and the negative electrode. Thus, an area of the separator, which does not face the positive electrode and the negative electrode, may be formed on the circumference of the separator. Thus, the short-circuit part 200 may be attached along the area of the circumference of the separator in the electrode assembly 100, which does not face the positive electrode and the negative electrode.

As described above, the short-circuit part 200 may have electrical conductivity. When the short-circuit part 200 is attached to an area of the separator, which faces the positive electrode or the negative electrode, the short-circuit part may be in direct contact with the positive electrode or the negative electrode. In this case, performance of the secondary battery may be adversely affected.

An operating principle of the short-circuit part 200 in the secondary battery according to the present invention will be described as follows.

When the temperature in the secondary battery is less than a predetermined temperature, the short-circuit part 200 may be spaced apart from the positive electrode tab 110a and the negative electrode tab 120a.

Then, when the temperature in the secondary battery reaches the predetermined temperature or more, the separator in the electrode assembly are contracted. This may be due to the fact that the separator is contracted when the separator is exposed to an abnormal high-temperature due to characteristics of a material.

That is, the separator is usually made of a polymer material such as polyethylene or polypropylene, and the polymer material is contracted while being melted at a high temperature. It is seen that the present invention utilizes characteristics of the separator made of the polymer material such as polyethylene or polypropylene at the high temperature.

Accordingly, the short-circuit part 200 may be in contact with each of the positive electrode 110a and the negative electrode tab 120a by the contraction of the separator, to which the short-circuit part 200 is attached, and thus, the positive electrode tab 110a and the negative electrode tab 120a are electrically connected to each other by the short-circuit part 200. As a result, short circuit occurs between the positive electrode and the negative electrode to cause discharge of the secondary battery, thereby stopping the temperature increase of the secondary battery.

The electrode assembly 100 may include a plurality of separators. According to an example of the present invention, the short-circuit part 200 may be attached to only one of the plurality of separators in the electrode assembly 100. However, unlike this structure, according to another example of the present invention, the short-circuit part 200 may be attached to two or more of the plurality of separators in the electrode assembly 100. According to the above example of the present invention, since the short-circuit part 200 only needs to be attached to one separator, the process may be simplified. On the other hand, according to the other example of the present invention, even if the short-circuit part 200 is separated from one of the plurality of separators, the short-circuit part 200 may still be attached to the other separator, and thus a normal operation of the short-circuit part 200 may be possible.

As described above, when the short-circuit part 200 is in direct contact with the positive or negative electrode of the electrode assembly 100, performance of the secondary battery may be adversely affected. Thus, according to the present invention, the short-circuit part 200 may be spaced apart from the positive electrode and the negative electrode in the electrode assembly 100 regardless of the temperature of the secondary battery. That is, according to the present invention, the short-circuit part 200 may be separated from the positive electrode and the negative electrode in the electrode assembly 100 at a temperature less than the predetermined temperature and a temperature equal to or greater than the predetermined temperature.

Also, when the short-circuit part 200 is in direct contact with the exterior of the secondary battery, the exterior may be damaged due to a reaction between the exterior and the short-circuit part 200. Thus, according to the present invention, the short-circuit part 200 may be provided to be spaced inward from the exterior of the secondary battery.

As illustrated in FIGS. 1 and 2, according to the first embodiment of the present invention, the short-circuiting part 200 may be provided in a single number. FIGS. 1 and 2 illustrate a state in which one short-circuit part 200 is attached to a circumference of one side of the separator.

Figure 3:
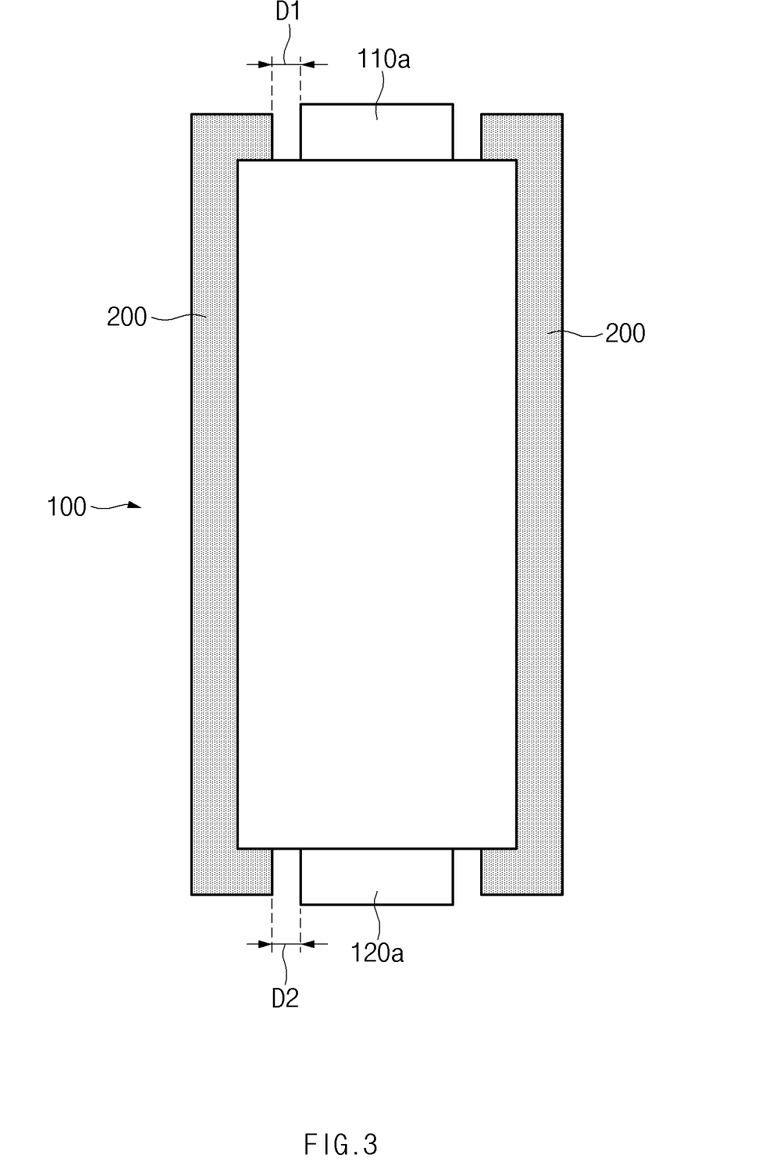
FIG. 3 is a plan view illustrating a state in which a secondary battery normally operates according to a second embodiment of the present invention.
Figure 4:
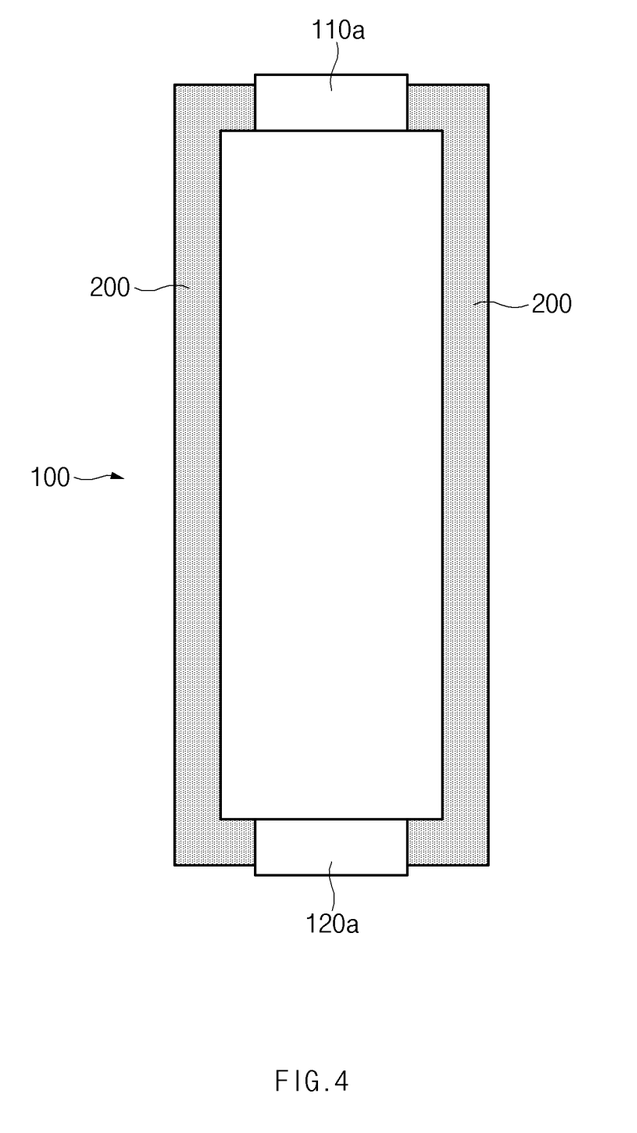
FIG. 4 is a plan view illustrating a state in which the secondary battery abnormally increases in temperature according to the second embodiment of the present invention.

FIG. 3 is a plan view illustrating a state in which a secondary battery normally operates according to a second embodiment of the present invention, and FIG. 4 is a plan view illustrating a state in which the secondary battery abnormally increases in temperature according to the second embodiment of the present invention.

According to the second embodiment of the present invention, a plurality of short-circuit parts 200 may be provided in a secondary battery. FIGS. 3 and 4 illustrate a state in which two short-circuit parts 200 are provided. Separators to which the two short-circuit parts 200 are attached may be identical to each other.

Here, as illustrated in FIGS. 3 and 4, one of the two short-circuit parts 200 may be attached along a circumference of one side of the separator, to which the short-circuit part 200 is attached, and the other may be attached along a circumference of the other side of the separator, to which the short-circuit part 200 is attached. However, unlike this structure, the separators which the two short-circuit parts 200 are attached may be separators different from each other.

Figure 5:
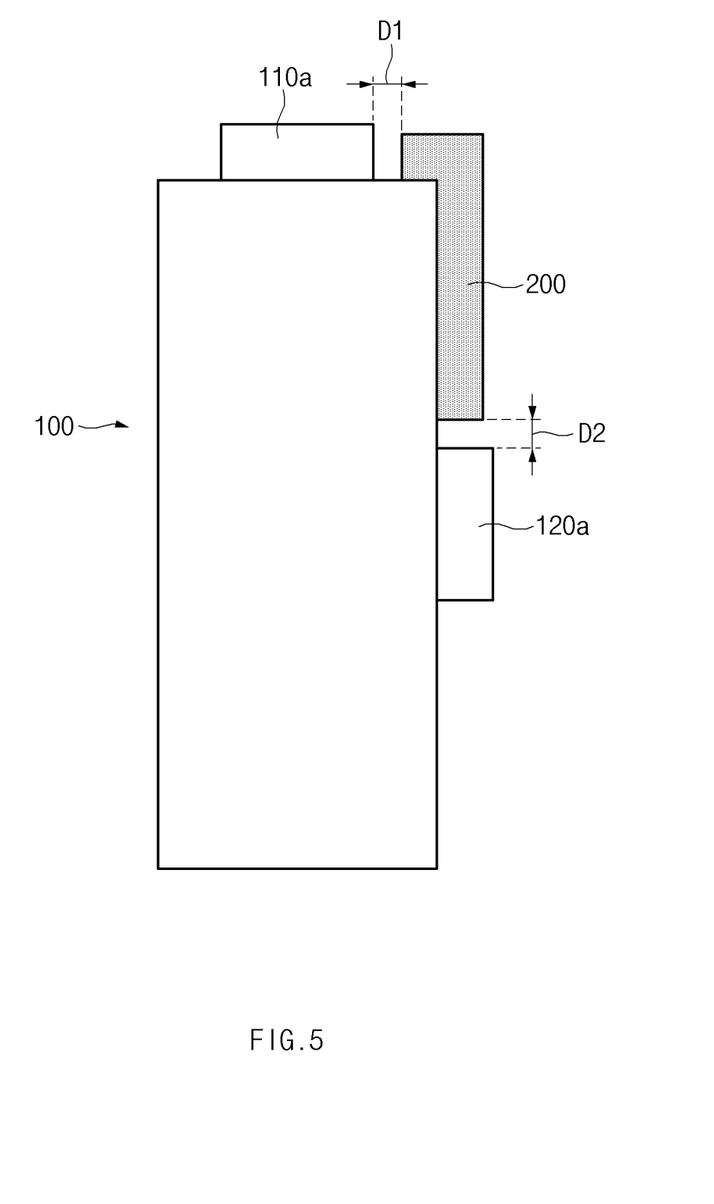
FIG. 5 is a plan view illustrating a state in which a secondary battery normally operates according to a third embodiment of the present invention.
Figure 6:
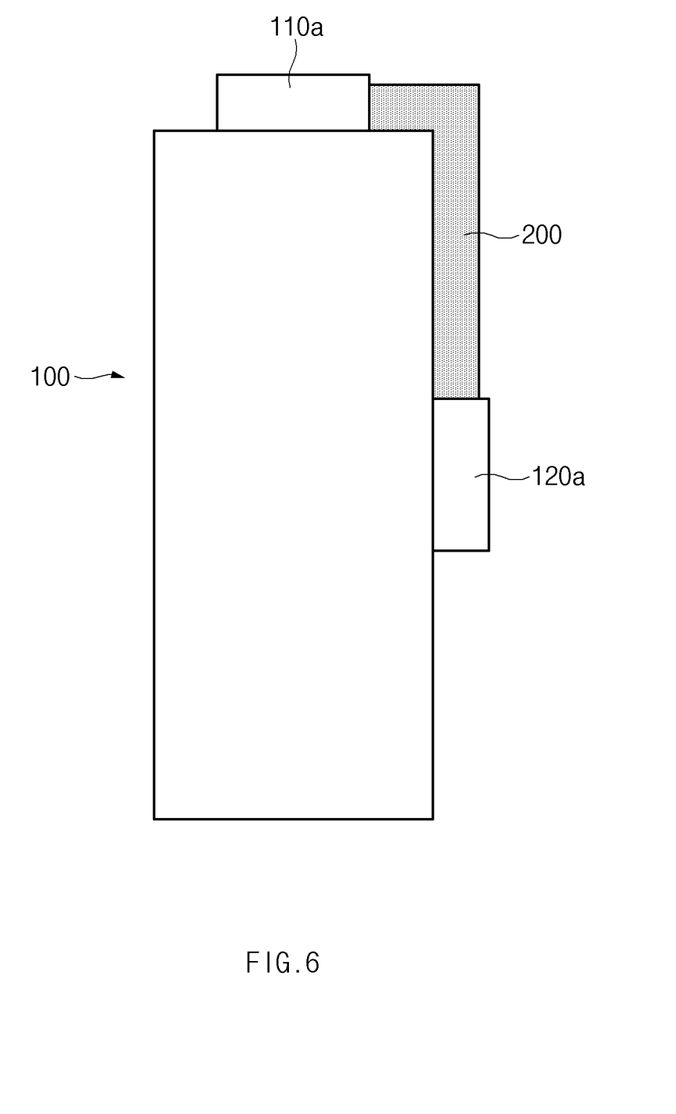
FIG. 6 is a plan view illustrating a state in which the secondary battery abnormally increases in temperature according to the third embodiment of the present invention.

FIG. 5 is a plan view illustrating a state in which a secondary battery normally operates according to a third embodiment of the present invention, and FIG. 6 is a plan view illustrating a state in which the secondary battery abnormally increases in temperature according to the third embodiment of the present invention.

Unlike the first and second embodiments of the present invention, according to the third embodiment of the present invention, a negative electrode tab 120a may protrude from the other side (a right side of an electrode assembly in FIGS. 5 and 6) of the electrode assembly, which is formed adjacent to one side (an upper side of the electrode assembly in FIGS. 5 and 6) of the electrode assembly, from which a positive electrode tab 110a protrudes. Also, the short-circuit part 200 may be attached along a circumference having the shortest distance, which connects the positive electrode tab 110a to the negative electrode tab 120a, on a circumferences of the separator of the electrode assembly. Thus, according to the third embodiment of the present invention, the short-circuit part 200 may have an approximately L-shape.

As described above, according to the present invention, the short-circuit part 200 may be spaced apart from the positive electrode tab 110a and the negative electrode tab 120a at a temperature less than a predetermined temperature, and then the short-circuit part 200 may be in contact with the positive electrode tab 110a and the negative electrode tab 120a at a temperature equal to or greater than the predetermined temperature.

Thus, as illustrated in FIGS. 1, 3, and 5, the short-circuiting part 200 may be attached to the separator in a state of extending from a position spaced a first distance D1 from the positive electrode tab 110a to a position spaced a second distance D2 from the negative electrode tab 120a at the temperature less than the predetermined temperature.

Then, when the separator is contracted at the temperature equal to or greater than the predetermined temperature, a length by which the separator, to which the short-circuiting part 200 is attached, is contracted in a direction parallel to the first distance D1 may be greater than the first distance D1. This is to allow the short-circuit part 200 to be in contact with the positive electrode tab 110a at the temperature equal to or greater than the predetermined temperature.

Similarly, when the separator is contracted at the temperature equal to or greater than the predetermined temperature, a length by which the separator, to which the short-circuiting part 200 is attached, is contracted in a direction parallel to the second distance D2 may be greater than the second distance D2. This is to allow the short-circuit part 200 to be in contact with the negative electrode tab 120a at the temperature equal to or greater than the predetermined temperature.

Battery Pack

A battery pack according to the present invention may include a plurality of secondary batteries, each of which includes a short-circuit part. Contents on the short-circuit part and the secondary battery are substituted with the above contents.

At least some of the plurality of secondary batteries constituting the battery pack according to the present invention may share one short-circuit part with each other. That is, according to the present invention, one short-circuit part may be attached to each of the separators in the secondary batteries different from each other. In this case, when a temperature of the battery pack or the secondary battery increases abnormally, since the use of the short-circuit part is minimized while occurring short circuit between the positive electrode and the negative electrode by the short-circuit part, it may be more advantageous in terms of saving materials for manufacturing the battery pack.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Electrode assembly
110a: Positive electrode tab
120a: Negative electrode tab
200: Short-circuit part

The invention claimed is:

1. A secondary battery comprising:
   an electrode assembly having a positive electrode, a separator, a negative electrode, and a separator alternately disposed, the electrode assembly comprising a positive electrode tab protruding from the positive electrode and a negative electrode tab protruding from the negative electrode;
   an exterior configured to accommodate the electrode assembly; and
   a short-circuit part accommodated in the exterior and having electrical conductivity,
   wherein the short-circuit part is attached to the separator in the electrode assembly,
   wherein the short-circuit part is not in direct contact with the positive electrode tab and the negative electrode tab at a temperature less than a predetermined temperature, and
   wherein the short-circuit part is in direct contact with the positive electrode tab and the negative electrode tab by contraction of the separator at a temperature equal to or greater than the predetermined temperature to electrically connect the positive electrode tab to the negative electrode tab.

2. The secondary battery of claim 1, wherein the positive electrode tab protrudes from a first side of the electrode assembly, and
   wherein the negative electrode tab protrudes from a second side of the electrode assembly.

3. The secondary battery of claim 1, wherein the short-circuit part is attached to a first separator of a plurality of separators in the electrode assembly.

4. The secondary battery of claim 1, wherein the short-circuit part is attached to two or more of a plurality of separators in the electrode assembly.

5. The secondary battery of claim 1, wherein the short-circuit part is attached along a perimeter of the separator in the electrode assembly.

6. The secondary battery of claim 5, wherein the short-circuit part is provided in plurality,
   wherein a first short-circuit part of the plurality of short-circuit parts is attached to a perimeter of a first side of the separator and
   wherein a second separator of the plurality of short-circuit parts is attached to a perimeter of a second side of the separator.

7. The secondary battery of claim 1, wherein the short-circuit part is spaced inward from the exterior.

8. The secondary battery of claim 2, wherein the second side of the electrode assembly is opposite to the first side of the electrode assembly.

9. The secondary battery of claim 2, wherein the second side of the electrode assembly is adjacent to the first side of the electrode assembly.

10. The secondary battery of claim 1, wherein the short-circuit part is spaced apart from the positive electrode and the negative electrode in the electrode assembly at the temperature less than the predetermined temperature and the temperature equal to or greater than the predetermined temperature.

11. The secondary battery of claim 5, wherein the short-circuit part extends from a first position, which is spaced a first distance (D1) from the positive electrode tab, to a second position, which is spaced a second distance (D2) from the negative electrode tab, at the temperature less than the predetermined temperature,
    wherein a length by which the separator, to which the short-circuiting part is attached, is contracted in a direction parallel to the first distance (D1) is greater than the first distance (D1), and
    wherein a length by which the separator, to which the short-circuiting part is attached, is contracted in a direction parallel to the second distance (D2) is greater than the second distance (D2).

12. The secondary battery of claim 1, wherein the exterior comprises a pouch-type sheet exterior.

13. A battery pack in which the secondary battery of claim 1 is provided in plurality.

14. The secondary battery of claim 9, wherein the short circuit part is L-shaped.

15. The secondary battery of claim 1, wherein the alternately disposed positive electrode, separator, negative electrode, and separator form an electrode stack, and
    wherein the positive electrode tab and negative electrode tab protrude from the electrode stack.

16. The secondary battery of claim 15, wherein the positive electrode tab and negative electrode tab protrude in a length direction, and
    wherein a width of the positive electrode tab and negative electrode tab is less than a width of the electrode stack.

17. The secondary battery of claim 15, wherein the alternately disposed positive electrode, separator, negative electrode, and separator form an electrode stack, and
    wherein a length of the short-circuit part is greater than a length of the electrode stack.

* * * * *